(12) United States Patent
Axmon et al.

(10) Patent No.: US 10,541,802 B2
(45) Date of Patent: *Jan. 21, 2020

(54) APPLICATION OF TIMING ADVANCE COMMAND IN WIRELESS COMMUNICATION DEVICE IN ENHANCED COVERAGE MODE

(71) Applicant: Telefonaktiebolaget LM Ericsson (publ), Stockholm (SE)

(72) Inventors: Joakim Axmon, Kävlinge (SE); Johan Bergman, Stockholm (SE); Dandan Hao, Beijing (CN); Muhammad Kazmi, Bromma (SE); Santhan Thangarasa, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

This patent is subject to a terminal disclaimer.

(21) Appl. No.: 15/253,404

(22) Filed: Aug. 31, 2016

(65) Prior Publication Data
US 2017/0288845 A1 Oct. 5, 2017

Related U.S. Application Data

(63) Continuation-in-part of application No. PCT/CN2016/078020, filed on Mar. 31, 2016.

(51) Int. Cl.
*H04L 5/16* (2006.01)
*H04L 29/08* (2006.01)
*H04W 72/04* (2009.01)

(52) U.S. Cl.
CPC ............... *H04L 5/16* (2013.01); *H04L 67/12* (2013.01); *H04W 72/042* (2013.01); *H04W 72/048* (2013.01); *H04W 72/0446* (2013.01)

(58) Field of Classification Search
CPC . H04W 72/042; H04W 72/0446; H04W 4/70; H04W 56/0015; H04W 56/0045;
(Continued)

(56) References Cited

U.S. PATENT DOCUMENTS

| 2010/0278142 A1* | 11/2010 | Dwyer | H04W 36/0066 370/331 |
| 2011/0158188 A1* | 6/2011 | Womack | H04W 56/0005 370/329 |

(Continued)

FOREIGN PATENT DOCUMENTS

| CN | 104581925 B | 1/2019 |
| RU | 2516449 C2 | 5/2014 |

(Continued)

OTHER PUBLICATIONS

Unknown, Author, "Analysis of Uplink Transmit Timing in NB-IoT", Ericsson, 3GPP TSG RAN WG4 Meeting #78bis, R4-161945, San Jose del Caba, Mexico, Apr. 11-15, 2016, 1-7.

(Continued)

*Primary Examiner* — Yemane Mesfin
*Assistant Examiner* — Mon Cheri S Davenport
(74) *Attorney, Agent, or Firm* — Murphy, Bilak & Homiller, PLLC

(57) ABSTRACT

Embodiments disclosed herein relate to a method in a wireless communication device that operates in an enhanced coverage mode, the enhanced coverage mode comprising sequential repetition of messages sent from the wireless communication device to a network node. An example method includes: receiving a Timing Advance Command TAC from the network node; and adapting a time at which the TAC is applied, wherein a time difference between the time at which the TAC is applied and a time at which the TAC is received shall be greater than or equal to a specified (Continued)

time depending on a type of the used Radio Access Technology, such that application of the TAC does not occur during a period after a first subframe of a repeated uplink transmission till the end of the repeated uplink transmission.

46 Claims, 6 Drawing Sheets

(58) Field of Classification Search
CPC ........... H04W 72/0413; H04W 72/048; H04W 88/02; H04L 5/0053; H04L 1/08; H04L 5/0005; H04L 5/0082; H04L 5/16; H04L 67/12; H04J 11/0079
See application file for complete search history.

(56) References Cited

U.S. PATENT DOCUMENTS

| | | | | |
|---|---|---|---|---|
| 2013/0188473 | A1* | 7/2013 | Dinan | H04W 56/0005 370/216 |
| 2014/0086219 | A1* | 3/2014 | Suzuki | H04W 56/0005 370/336 |
| 2015/0131579 | A1 | 5/2015 | Li et al. | |
| 2016/0262182 | A1 | 9/2016 | Yang et al. | |
| 2016/0353440 | A1 | 12/2016 | Lee et al. | |
| 2017/0290001 | A1* | 10/2017 | Axmon | H04W 4/70 |
| 2017/0347335 | A1 | 11/2017 | Yi et al. | |
| 2018/0076924 | A1* | 3/2018 | Lee | H04L 1/0026 |

FOREIGN PATENT DOCUMENTS

| | | |
|---|---|---|
| WO | 2015062470 A1 | 5/2015 |
| WO | 2015109607 A1 | 7/2015 |
| WO | 2015116732 A1 | 8/2015 |
| WO | 2016025638 A1 | 2/2016 |
| WO | 2016025899 A1 | 2/2016 |

OTHER PUBLICATIONS

Unknown, Author, "Timing advance for NB-IoT", Ericsson, 3GPP TSG RAN WGI NB-IoT Ad-Hoc Meeting, R1-162052, Sophia Antipolis, France, Mar. 22-24, 2016, 1-4.
3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.7.0, Mar. 2015, Jan. 1014.
Unknown, Author, "Introduction of further LTE Physical Layer Enhancements for MTC-Change Request", 3GPP TSG-RAN Meeting #70, R1-157926, Stiges, Spain, Dec. 7-10, 2015, 1-2.
Unknown, Author, "Introduction of Rel-13 eMTC feature to LTE RAN1specs", 3GPP TSG RAN Meeting #70, RP-152024, Sitges, Spain, Dec. 7-10, 2015, 1.
Unknown, Author, "Uplink transmit timing adjustments in HD-FDD operation-Change Request", 3GPP TSG-RAN WG4 Meeting #78AH, R4-78AH-0192, Kista, Sweden, May 3-4, 2016, 1-4.
3GPP, "3rd Genration Partnership Project; Technical Specification Group Radio Access Network; E-UTRA; Requirements for support of radio resource management (Release 13)", 3GPP TS 36.133 V13.2.0, Jan. 2016, pp. 1-50.
Unknown, Author, "Analysis of Uplink Transmit Timing in NB-IoT", 3GPP TSG RAN WG4 Meeting #78bis, R4-161945, San Jose del Cabo, Mexico, Apr. 11-15, 2016, pp. 1-9.
Unknown, Author, "Discussions on timing requirements for eMTC", 3GPP TSG RAN WG4 Meeting #78bis, R4-162569, San Jose del Cabo, Mexico, Apr. 11-15, 2016, pp. 1-5.
Unknown, Author, "Timing requirements for eMTC", 3GPP TSG-RAN4 Meeting #78bis, R4-162561, San Jose del Cabo, Mexico, Apr. 11-15, 2016, pp. 1-5.
Unknown, Author, "Uplink transmit timing adjustments in HD-FDD operation", 3GPP TSG-RAN WG4 Meeting #78AH, Kista, Sweden, May 3-4, 2016, pp. 1-6.
3GPP, "PRACH for MTC UE", 3GPP TSG RAN WG1 Meeting #82bis, R1-155867, Malmö, Sweden, Oct. 5-9, 2015, pp. 1-6.

* cited by examiner

APPLICATION OF TIMING ADVANCE COMMAND IN WIRELESS COMMUNICATION DEVICE IN ENHANCED COVERAGE MODE

RELATED APPLICATION

The present application claims the benefit of and priority to International Patent Application Serial No. PCT/CN2016/078020, filed 31 Mar. 2016, the entire contents of which are incorporated herein by reference.

TECHNICAL FIELD

Embodiments herein relate generally to a wireless communication system, a method in a wireless communication device, a method in a network node, a wireless communication device, and a network node. More particularly, the embodiments herein relate to the Application of Timing Advance Commands (TACs) in a wireless communication device in an Enhanced Coverage (CE) mode.

BACKGROUND

A wireless communication device, for example, an Evolved Machine Type Communication (eMTC) device or a Narrowband Internet of Things (NB-IoT) device, may operate in a coverage enhancement mode. The coverage enhancement mode is implemented by subsequent repetition of messages transmitted between said device and a network node (e.g. eNodeB or base station).

3GPP TS 36.133 V12.10.0, clause 7.3.2.1, specifies the following on when a timing advance command is to be applied: the UE shall adjust the timing of its uplink transmission timing at sub-frame n+6 for a timing advance command received in sub-frame n. The timing advance is, for an HD-FDD eMTC device, considered to have been received in the last repetition of the M-PDCCH, i.e., in subframe n. Thus, according to the rule specified in 3GPP TS 36.133, the transmit timing is therefore adjusted, in accordance to the received TAC, in subframe n+6.

SUMMARY

If conventional approaches are applied in the coverage enhancement mode, when TACs that have been received on the downlink are applied it is possible that the reception performance of the network node would degrade. Particularly, if the TAC is applied after the onset (i.e., the first subframe) till the end of an uplink transmission, the accumulated reference signals or message on the network node side will get corrupted by the linear phase change that results when the uplink transmit timing is changed as a result of the TAC. For instance, channel estimates that may be based on coherent averaging or filtering over successive repetitions would be distorted, resulting in a degraded decoding performance.

Hence there is a need for a new rule for Application of TAC in wireless communication devices (for example, eMTC devices and NB-IoT devices) that operate in coverage enhancement mode.

An object of some of the techniques and apparatus disclosed herein is therefore to obviate at least one of the above disadvantages and to provide improved communication between a wireless communication device, such as eMTC or NB-IoT, and a network node in a wireless communication system.

According to an aspect of the presently disclosed techniques and apparatus, this object is achieved by a wireless communication system including a wireless communication device and a network node, the wireless communication device operating in an enhanced coverage mode, the enhanced coverage mode comprising sequential repetition of messages sent from the wireless communication device to the network node. The network node includes: a sending unit configured to send a TAC to the wireless communication device. The wireless communication device includes: a receiving unit configured to receive the TAC from the network node; and an adapting unit configured to adapt a time at which the TAC is applied. The time difference between the time at which the TAC is applied and a time at which the TAC is received shall be greater than or equal to a specified time depending on the type of the used Radio Access Technology, and application of the TAC shall not occur during a period after a first subframe of a repeated uplink transmission until the end of said repeated uplink transmission.

According to another aspect, the object is achieved by a method in a wireless communication device that operates in an enhanced coverage mode, the enhanced coverage mode comprising sequential repetition of messages sent from the wireless communication device to a network node. The method includes: receiving a TAC from the network node; and adapting a time at which the TAC is applied. A time difference between the time at which the TAC is applied and a time at which the TAC is received shall be greater than or equal to a specified time depending on the type of the used Radio Access Technology, and application of the TAC shall not occur during a period after a first subframe of a repeated uplink transmission until the end of said repeated uplink transmission.

According to yet another aspect, the object is achieved by a method in a network node in communication with a wireless communication device that operates in an enhanced coverage mode, the enhanced coverage mode comprising sequential repetition of messages sent from the wireless communication device to the network node. The method includes: configuring the wireless communication device to transmit multiple uplink signals with different repetition periods; and configuring the wireless communication device to align the repetition periods by shifting in time at least one of start or end points of the repetition periods, such that an overlapping time of the repetition periods is maximized.

According to yet another aspect, the object is achieved by a wireless communication device that operates in an enhanced coverage mode, the enhanced coverage mode comprising sequential repetition of messages sent from the wireless communication device to a network node. The wireless communication device includes: a receiving unit configured to receive a TAC from the network node; and an adapting unit configured to adapt a time at which the TAC is applied. A time difference between the time at which the TAC is applied and a time at which the TAC is received shall be greater than or equal to a specified time depending on the type of the used Radio Access Technology, and application of the TAC shall not occur during a period after a first subframe of a repeated uplink transmission until the end of said repeated uplink transmission.

According to yet another aspect, the object is achieved by a network node in communication with a wireless communication device that operates in an enhanced coverage mode, the enhanced coverage mode comprising sequential repetition of messages sent from the wireless communication device to the network node. The network node includes a configuring unit configured to: configure the wireless communication device to transmit multiple uplink signals with different repetition periods; and configure the wireless communication device to align the repetition periods by shifting in time at least one of start or end points of the repetition periods, such that an overlapping time of the repetition periods is maximized.

According to yet another aspect, the object is achieved by a wireless communication device, wherein the wireless communication device is configured with hardware circuitry to carry out the above method for wireless communication device.

According to yet another aspect, the object is achieved by a network node configured with hardware circuitry to carry out a configuration of a wireless communication device for alignment of repetition periods.

According to yet another aspect, the object is achieved by a computer-readable medium, carrying instructions, which, when executed by a processor, cause the processor to carry out any one of the above methods.

According to yet another aspect, the object is achieved by a computer-program, accessible by a processor of a wireless communication device or a network node, which the computer-program, when executed by the processor, causes the processor to carry out any one of the above methods.

Embodiments herein afford many advantages, of which a non-exhaustive list of examples is as follows:

The system performance is improved compared to applying the existing rule for application of timing advance. Particularly, distortion due to application of timing advance during an uplink transmission is avoided.

The alignment between the repetition periods of multiple uplink signals enables the wireless communication device to apply the received TAC command to adjust its uplink transmit timing immediately or with a shorter delay after the end of the repetition period of each uplink signal and as soon as the after the occurrence of the time resource.

BRIEF DESCRIPTION OF THE DRAWINGS

The embodiments herein will now be further described in more detail in the following detailed description by reference to the appended drawings illustrating the embodiments and in which.

DETAILED DESCRIPTION OF EMBODIMENTS

Figure 1:
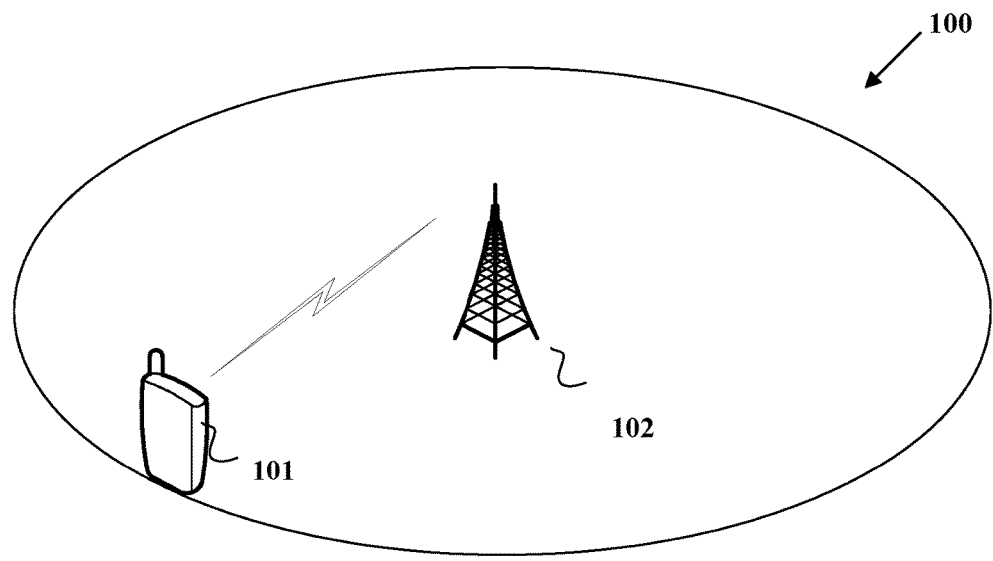
FIG. 1 is a schematic diagram showing one embodiment of a wireless communication system.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present technology is described below with reference to block diagrams and/or flowchart illustrations of methods, nodes, devices (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

It should be noted that resource releasing methods performed by the BS and the UE, based on different resource releasing reasons, will be schematically illustrated in the following figures. It should noted that while the one or more methods shown herein, for example, in the form of a flow chart or flow diagram, are shown and described as a series of steps, for purposes of simplicity of explanation, it is to be understood and appreciated that the methods are not limited to the illustrated or described order of steps, unless the context clearly indicates otherwise, as some steps may, in accordance therewith, occur in a different order and/or concurrently with other acts from that shown and described herein. It will be appreciated for the person skilled in the art to implement the alteration, modification and variant of the methods without departing from the spirit and scope of this disclosure, which means different permutation or combination of the steps corresponding to the methods described in different figures, will be apparent when the person skilled in the art after reading the disclosure.

The embodiments herein provide a new rule for Application of TAC in wireless communication devices (for example eMTC devices and NB-IoT devices) that operate in coverage enhancement mode. Some technical contexts of the embodiments herein are introduced firstly.

eMTC eMTC features specified in 3GPP technical contributions identified by 3GPP as contribution documents 3GPP RP-152024 and 3GPP R1-157926 include a low-complexity user equipment (UE) category called UE category M1 (or Cat-M1 for short) and coverage enhancement techniques, CE modes A and B, that can be used together with UE category M1 or any other LTE UE category.

All eMTC features, for both Cat-M1 and CE modes A and B, as defined in 3GPP TS 36.133 V12.7.0, Section 7.1.2, operate using a reduced maximum channel bandwidth compared to normal LTE. The maximum channel bandwidth in eMTC is 1.4 MHz, whereas it is up to 20 MHz in normal LTE. The eMTC UEs are still able to operate within the larger LTE system bandwidth, generally without problems. The main difference compared to normal LTE UEs is that the eMTCs can only be scheduled with 6 physical resource blocks (PRBs) at a time, where each of these PRBs has a bandwidth of 180 kHz.

In CE modes A and B, the coverage of physical channels is enhanced through various coverage enhancement techniques, the most important being repetition or retransmission. In its simplest form, this means that the 1-millisecond subframe to be transmitted is repeated a number of times, e.g., just a few times if a small coverage enhancement is needed or hundreds or thousands of times if a large coverage enhancement is needed.

NB-IoT

The objective of the Narrow Band Internet-of-things (NB-IoT) initiative of the 3GPP is to specify a radio access for cellular internet of things (IoT), based to a great extent on a non-backward-compatible variant of E-UTRA (LTE), that addresses improved indoor coverage, support for massive number of low throughput devices, low delay sensitivity, ultra-low device cost, low device power consumption and (optimized) network architecture.

The NB-IoT carrier BW (Bw2) is 200 KHz. Examples of the operating bandwidth (Bw1) of LTE, in contrast, are 1.4 MHz, 3 MHz, 5 MHz, 10 MHz, 15 MHz, 20 MHz, etc.

NB-IoT radio access supports three different modes of operation:

1. 'Stand-alone operation' utilizing, for example, the spectrum currently being used by GERAN systems as a replacement of one or more GSM carriers. In principle this mode of operation can use any carrier frequency which is neither within the carrier of another co-located (or overlapping) system nor within the guard band of another system's operating carrier. The other system can be another NB-IoT operation or any other radio access technology (RAT), e.g., LTE.
2. 'Guard band operation' utilizing the unused resource blocks within a LTE carrier's guard-band. The term guard band may also interchangeably be called guard bandwidth. As an example, in the case of an LTE BW of 20 MHz (i.e., Bw1=20 MHz or 100 RBs), the guard band operation of NB-IOT can be placed anywhere outside the central 18 MHz but within 20 MHz LTE BW.
3. 'In-band operation' utilizing resource blocks within a normal LTE carrier. The in-band operation may also interchangeably be called in-bandwidth operation. More generally the operation of one RAT within the BW of another RAT is also called in-band operation. As an example, in a LTE BW of 50 RBs (i.e., Bw1 of 10 MHz or 50 RBs), NB-IoT operation over one resource block (RB) within the 50 RBs is called in-band operation.

In NB-IoT, the downlink transmission is based on Orthogonal Frequency-Division Multiplexing (OFDM), with 15 kHz subcarrier spacing for all the scenarios: stand-alone, guard-band, and in-band. For uplink transmission, both multi-tone transmissions, based on single-carrier Frequency-Division Multiple Access (SC-FDMA), and single tone transmission are supported. This means that the physical waveforms for NB-IoT in downlink and also partly in uplink are similar to those in legacy LTE.

In the downlink design, NB-IoT supports both master information broadcast and system information broadcast which are carried by different physical channels. For in-band operation, it is possible for NB-IoT UE to decode NB-PBCH (also referred to as NPBCH) without knowing the legacy PRB index. NB-IoT supports both downlink physical control channel (NB-PDCCH, also referred to as NPDCCH) and downlink physical shared channel (PDSCH, also referred to as NPDSCH). The operation mode of the NB-IoT radio access must be indicated to the UE, and currently 3GPP consider indication by means of NB-SSS (also referred to as NSSS), NB-MIB (carried on NB-PBCH, also referred to as NPBCH), or perhaps other downlink signals.

The reference signals to be used in NB-IoT have not yet been specified. However, it is expected that the general design principle will follow that of legacy LTE. Downlink synchronization signals will most likely consist of primary synchronization signal (NB-PSS, also referred to as NPSS) and secondary synchronization signal (NB-SSS, also referred to as NSSS).

Half-Duplex Operation

In half-duplex (HD) operation, or more specifically half-duplex FDD (HD-FDD) operation, the uplink (UL) and downlink (DL) transmissions take place on different paired carrier frequencies but not simultaneously in time in the same cell. This means that the uplink and downlink transmissions take place in different time resources. Examples of a time resource are symbols, time slots, subframes, transmission time intervals (TTIs), interleaving times, etc. In other words, uplink and downlink (e.g., subframes) do not overlap in time. The number and location of subframes used for downlink, uplink, or unused subframes can vary on a frame-to-frame basis, or on a basis of multiple frames. For example, in one radio frame (say frame#1), subframes #9, #0, #4 and #5 may be used for downlink, while subframes #2 and #7 are used for uplink transmission. But in another frame (say frame#2), subframes #0 and #5 are used for downlink and subframes #2, #3, #5, #7 and #8 are used for uplink transmission.

Timing Advance

In order to preserve orthogonality in uplink SC-FDMA transmissions, the uplink transmissions from multiple user equipments (UEs) in LTE need to be time aligned at a receiver, such as a base station, e.g., an LTE eNode B or the like. This means that the transmit timing of those UEs that are under the control of the same eNode B should be adjusted to ensure that their received signals arrive at the eNode B receiver at approximately the same time. More specifically, their received signals should arrive well within the cyclic prefix (CP), where the normal CP length is about 4.7 μs. This ensures that the eNode B receiver is able to use the same resources, i.e., the same Discrete Fourier Transform (DFT) or Fast Fourier Transform (FFT) resource, to receive and process the signals from multiple UEs.

The uplink timing advance (TA) is maintained by the eNode B through timing advance commands, also referred to as timing alignment commands, sent to the UE based on measurements on uplink transmissions from that UE. For example, the eNode B measures a two-way propagation delay or round-trip time for each UE, to determine the value of the TA required for that UE.

For a timing advance command received on subframe n, the corresponding adjustment of the uplink transmission timing is applied by the UE from the beginning of subframe n+6. The timing advance command indicates the change of the uplink timing relative to the current uplink timing of the UE transmission as multiples of 16 Ts, where Ts=32.5 ns and is called the "basic time unit" in LTE.

In the case of random access response messages transmitted by the eNode B's, an 11-bit timing advance command (TA) for a Timing Advance Group (TAG) indicates NTA values by index values of TA=0, 1, 2, . . . , 1282, where an amount of the time alignment for the TAG is given by NTA=TA×16. NTA is defined above in section "Alignment of E-UTRA TDD measurement gaps with particular subframe offsets".

In other cases, a 6-bit timing advance command (TA) for a TAG indicates adjustment of the current NTA value, NTA, old, to the new NTA value, NTA, new, by index values of TA=0, 1, 2, . . . , 63, where NTA, new=NTA, old+(TA−31)×16. Here, adjustment of NTA value by a positive or a negative amount indicates advancing or delaying the uplink transmission timing for the TAG by a given amount respectively.

Timing advance updates are signaled by the evolved Node B (eNB) to the UE in MAC PDUs.

Coverage Enhancements

The path loss between IoT device and the base station can be very large in some scenarios, such as when the device is used as a sensor or metering device located in a remote location such as in the basement of the building. In such scenarios, the reception of the signal from base station may be very challenging. For example, the path loss can be worse by 20 dB, compared to normal operation. In order to cope with such challenges, the coverage in uplink and/or in downlink has to be substantially enhanced with respect to the normal coverage (also referred to as legacy coverage). This is realized by employing one or several advanced techniques in the UE and/or in the radio network node for enhancing the coverage. Some non-limiting examples of such advanced techniques include transmit power boosting, repetition of transmitted signal, applying additional redundancy to the transmitted signal, use of advanced/enhanced receiver architectures, etc. In general, when employing such coverage enhancing techniques, the IoT radio access is regarded to be operating in 'coverage enhancing mode' or coverage extending mode.

When coverage enhancement is provided by means of transmission repetitions, the maximum number of repetitions for PDSCH and PUSCH, respectively, for coverage enhancement modes A and B are given by cell-specific broadcasted parameters:
pdsch-maxNumRepetitionCEmodeA (up to 32 repetitions),
pdsch-maxNumRepetitionCEmodeB (up to 2048 repetitions),
pusch-maxNumRepetitionCEmodeA (up to 32 repetitions),
pusch-maxNumRepetitionCEmodeB (up to 2048 repetitions).

The exact number of repetitions to use by a particular wireless communication device is signaled dynamically via the downlink control information (DCI), which is carried over the downlink control channel M-PDCCH. This channel, too, may be repeated according to a specific repetition number individually configured for each wireless communication device:
mPDCCH-NumRepetition (up to 256 repetitions).

When the wireless communication device transmits on the uplink control channel, it may use repetitions as individually configured by the network node:
pucch-NumRepetitionCE-Format1 (up to 8 (mode A) or 32 (mode B) repetitions),
pucch-NumRepetitionCE-Format2 (up to 8 (mode A) or 32 (mode B) repetitions).

Hence, depending on the coverage, wireless communication devices may apply different number of repetitions.

A low complexity UE (e.g., a UE with one receiver, or "Rx") may also be capable of supporting enhanced coverage mode of operation. The coverage level of the UE with regard to a cell may be expressed in terms of a signal level, such as signal quality, signal strength or path loss, with regard to that cell.

EXAMPLE EMBODIMENTS

The several embodiments of methods and apparatus described herein concern a rule wherein the wireless communication device avoids applying the TAC during an ongoing repetition period. That is, applying the TAC shall avoid a repetition period which is started and not finished.

FIG. 1 is a schematic diagram showing one embodiment of a wireless communication system 100 in which embodiments herein may be implemented. The wireless communication system 100 may in some embodiments apply to one or more Radio Access Technologies (RAT) such as, for example, LTE, LTE Advanced, WCDMA, GSM, Worldwide Interoperability for Microwave Access (WiMAX), or any other radio access technology.

In some embodiments, the wireless communication system 100 may include at least one wireless communication device 101 and at least one network node 102. However, the embodiments herein do not limit the number of the wireless communication device 101 and the network node 102.

In some embodiments, the wireless communication device 101 operates in an enhanced coverage mode in which the wireless communication device 101 transmits a sequential repetition of messages to the network node 102 in one or more uplink channels. In another embodiment, the network node 102 also operates in an enhanced coverage mode in which the network node 102 transmits a sequential repetition of messages to the network node 102 in one or more downlink channels. However, there is no need for the network node 102 to operate in an enhanced coverage mode.

The network node 102 may adjust the uplink transmitting timing of the wireless communication device 101 by sending a Timing Advance Command (TAC) to the wireless communication device 101. The wireless communication device 101 may adapt a time at which the TAC is applied according to a new rule. In one embodiment, the new rule can be expressed as: a time difference between the time at which the TAC is applied and a time at which the TAC is received shall be greater than or equal to a specified time depending on the type of the used Radio Access Technology; and application of the TAC shall not occur after a first subframe till the end of any repeated uplink transmission.

In LTE, the above specified time is defined as 6 subframes. Thus, in this context the wireless communication device 101 shall adjust the timing of its uplink transmission timing at subframe n+6 or later than subframe n+6 for a timing advance command received in subframe n. Furthermore, the uplink transmission timing adjustment of the wireless communication device 101 does not occur after the onset (i.e., the first subframe) till the end of any one repeated uplink transmission.

The system performance is improved compared to applying the existing rule for application of timing advance. Particularly, distortion due to application of timing advance during an uplink transmission is avoided.

In one embodiment, the new rule which the UE has to comply with and implement may, for instance, be captured for LTE in the specification (for example 3GPP 36.133) as follows.

When no uplink repetition period has been configured, or an uplink repetition period has been configured but with a single transmission (R=1), the UE shall adjust the timing of its uplink transmission timing at subframe n+6 for a timing advance command received in sub-frame n.

When an uplink repetition period has been configured for which the repetition R>1, the UE shall:
  adjust the timing of its uplink transmission timing at sub-frame n+6 for a timing advance command received in sub-frame n, provided that subframe n+6 does not fall within an ongoing uplink repetition period; otherwise
  adjust the timing of its uplink transmission timing at sub-frame k, where subframe k represents the onset of the first uplink repetition period for which k≥n+6.

Figure 2:
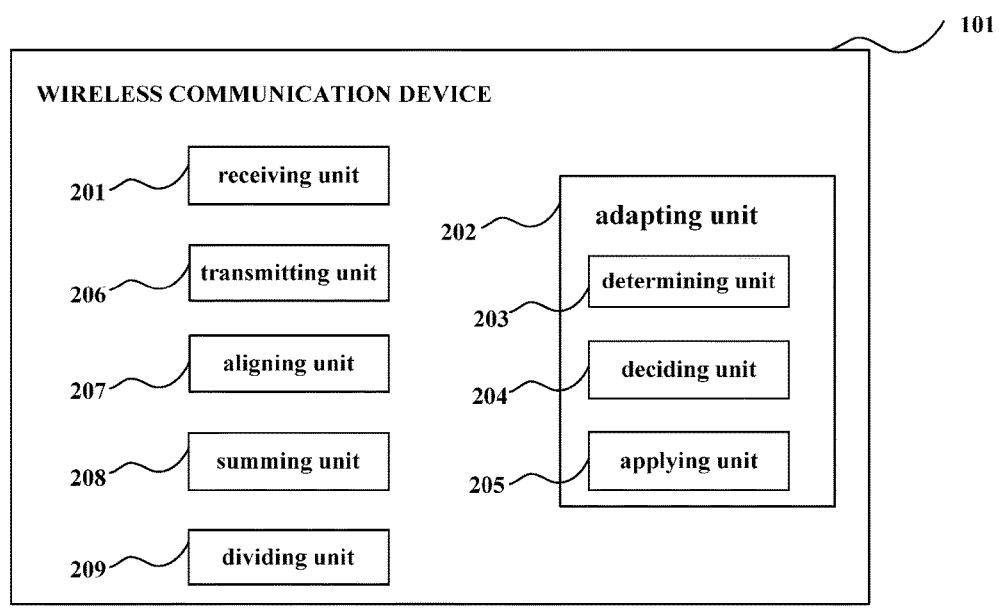
FIG. 2 is a schematic block diagram showing one embodiment of a wireless communication device.

FIG. 2 is a schematic block diagram showing an example embodiment of the wireless communication device 101. In some embodiments, as illustrated in FIG. 2, the wireless communication device 101 may include, but is not limited to, a receiving unit 201 and an adapting unit 202. The receiving unit 201 may be configured to receive the TAC from the network node, for example, at subframe n; and the adapting unit 202 may be configured to adapt a time at which the TAC is applied, according to the above mentioned new rule proposed herein.

In some embodiments, the adapting unit 202 may include, but is not limited to, a determining unit 203, a deciding unit 204, and an applying unit 205. Furthermore, the embodiments herein are not limited to this embodiment. In other embodiments, a determining unit 203, a deciding unit 204, and an applying unit 205 of the wireless communication device 101 are included in the adapting unit 202.

In some embodiments, the determining unit 203 may be configured to determine a subframe n at which the TAC is received, and determine a time difference, in the form of the number of subframes m, between the subframe n and a first subframe k of a first repeated uplink transmission. The deciding unit 204 may be configured to decide whether application of the TAC in subframe n+q would occur after the onset (first subframe) till the end of the first repeated uplink transmission and output a respective decision, if q is used to stand for the above mentioned specified delay in the form of the number of subframes. The applying unit 205 may be configured to receive the decision from the deciding unit 204 and apply the TAC according to the above decision.

More details regarding the wireless communication device 101 will be described in connection to FIGS. 6-8 hereinafter.

Figure 3:
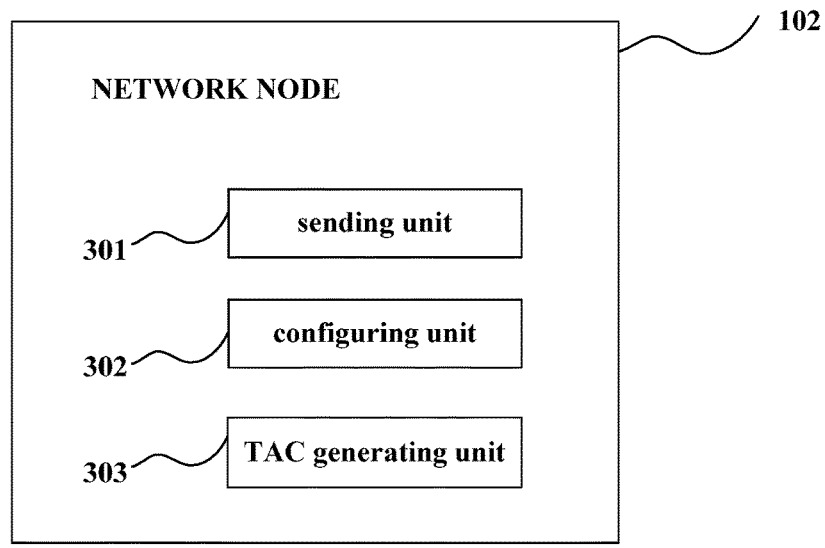
FIG. 3 is a schematic block diagram showing one embodiment of a network node in communication with the wireless communication device.

FIG. 3 is a schematic block diagram showing one embodiment of the network node 102 in communication with the wireless communication device 101. In some embodiments, as shown in FIG. 3, the network node 102 may include, but is not limited to, a TAC generating unit 303 and a sending unit 301. The TAC generating unit 303 may be configured to generate a TAC to be used by the wireless communication device 101, and the sending unit 301 may be configured to send the generated TAC to the wireless communication device 101. Note that, the embodiments herein are not limited to this embodiment. In other embodiments, the network node 102 does not include a TAC generating unit. In this case, the TAC may be generated by another node and sent to the network node 102, and the sending unit 301 of the network node 102 may send the received TAC to the wireless communication device 101.

In some embodiments, the network node 102 may include a configuring unit 302 which may configure the wireless communication device 101 to transmit multiple uplink signals with different repetition periods, and configure the wireless communication device 101 to align the repetition periods by shifting in time at least one of start or end points of the repetition periods, such that an overlapping time of the repetition periods is maximized or single transmission of the multiple uplink signals is minimized.

Figure 4:
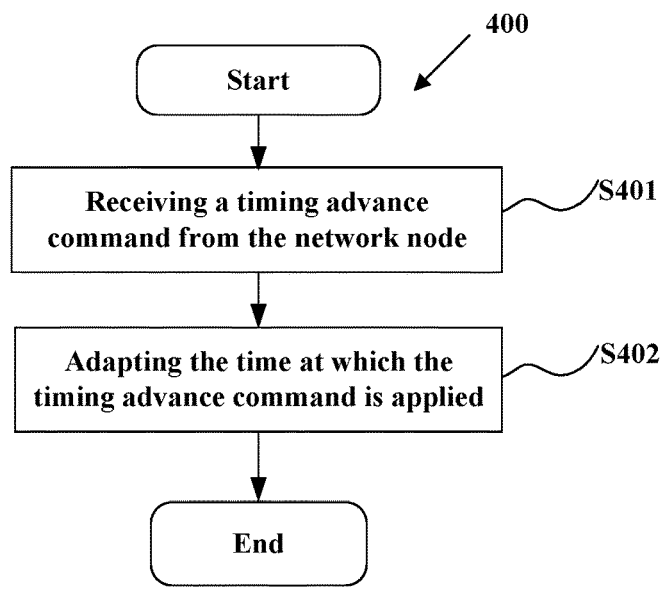
FIG. 4 is a flow chart showing one embodiment of a method in the wireless communication device.

FIG. 4 is a flow chart showing one embodiment of a method 400 in the wireless communication device 101. In some embodiments, the wireless communication device 101 operates in an enhanced coverage mode, the enhanced coverage mode comprising sequential repetition of messages sent from the wireless communication device 101 to the network node 102.

In some embodiments, the method may include, but is not limited to, the following steps illustrated in FIG. 4. In step S401, the wireless communication device 101 may receive a Timing Advance Command (TAC) from the network node 102. In step S402, the wireless communication device 101 may adapt a time at which the TAC is applied according the new rule proposed herein. According to the new rule, a time difference between the time at which the TAC is applied and a time at which the TAC is received shall be greater than or equal to a specified time depending on the type of the used Radio Access Technology; and application of the TAC shall not occur after a first subframe till the end of any repeated uplink transmission.

The wireless communication device 101 may be configured to transmit only one uplink repeated signal or at least two uplink repeated signals. The wireless communication device 101 may transmit the at least two uplink repeated signals in at least two uplink channels. The repetition periods of the at least two uplink signals may or may not overlap with each other in time.

Figure 5:
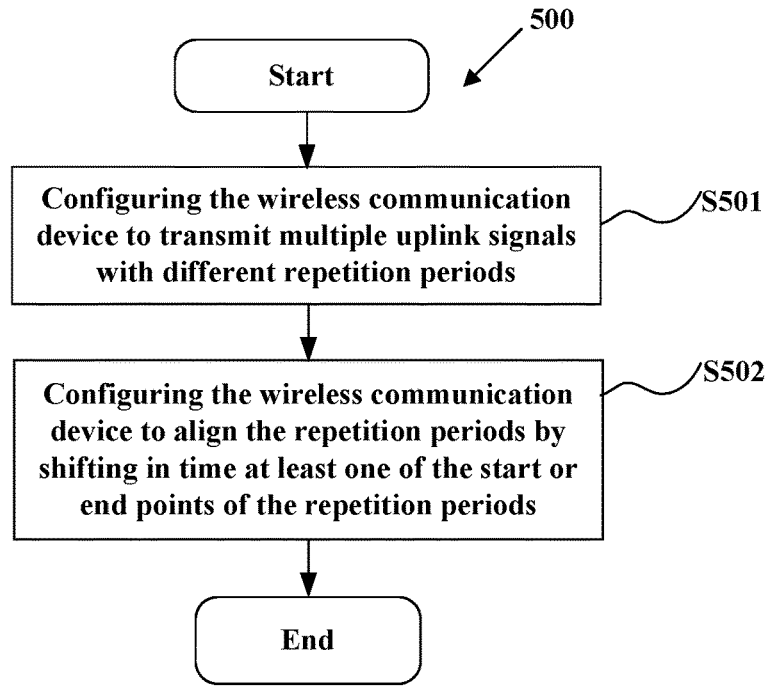
FIG. 5 is a flow chart showing one embodiment of a method in the network node.

FIG. 5 is a flow chart showing an example of a method 500 in the network node 102. In step S501, configuring unit 302 may configure the wireless communication device 101 to transmit multiple uplink signals with different repetition periods. In step S502, the configuring unit 302 of the network node 102 may configure the wireless communication device 101 to align the repetition periods by shifting in time at least one of start or end points of the repetition periods, such that an overlapping time of the repetition periods is maximized or single transmission of the multiple uplink signals is minimized.

Figure 6:
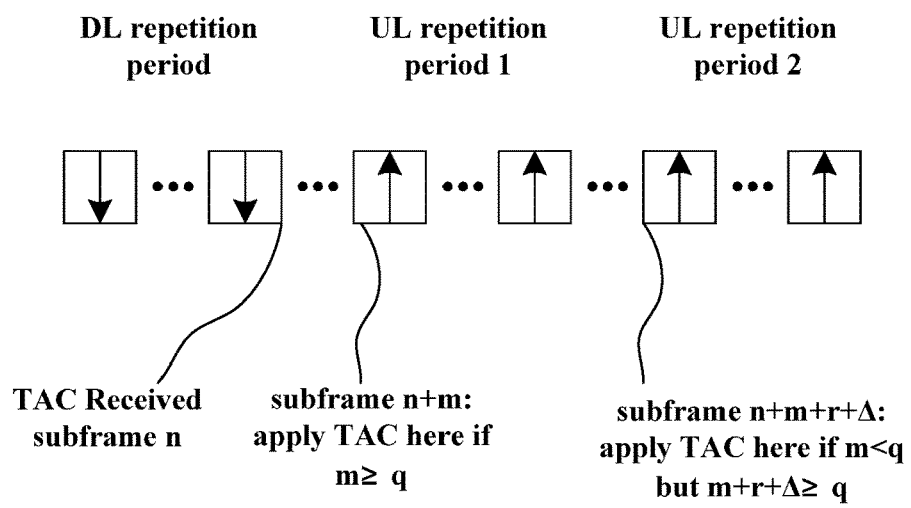
FIG. 6 is a schematic diagram showing one embodiment of operations in the wireless communication device.

FIG. 6 is a schematic diagram showing an example of operations in the wireless communication device 101, which describes a method in wireless communication device of adapting application of TAC when configured to transmit one signal with repetition during repetition period. In the illustrated scenario, it is assumed that the UE is configured to transmit one type of uplink signal with certain number of repetitions (N0) over a certain time period (T0). For example, over T0 the UE will transmit only one of the uplink signals. Examples of an uplink signal can be PUSCH, RACH, M-PUCCH, NB-IoT PUSCH, etc.

For example, the UE can be configured to transmit only PUSCH with 32 repetitions over 32 consecutive uplink time resources, e.g. 32 subframes, 32 TTIs, 32 interleaving time periods, etc. This corresponds to a repetition period (T0) of 32 ms for FDD. However, T0 in case of HD-FDD and TDD will be longer than 32 ms; the actual value of T0 would depend on the number of uplink subframes available in a frame.

In this case, the UE shall apply the TAC received from the network node at the start (for example first subframe) of T0 of the uplink signal, but not earlier than in n+X time resources. This means the UE shall not apply the received TAC during a period after the first subframe of T0 till the end of T0, but rather apply it in the first time resource in which T0 starts, such as the first uplink subframe within T0. The time resource "n" denotes the time resource in which the UE receives TAC and "X" represents a specified delay. The value of X may depend on the type of RAT. As an example X=6 subframes in LTE. The value of X allows the BS to adjust its receiver parameter and also the UE to process the received TAC command from the network node.

FIG. 6 illustrates a non-limiting example scenario, where the wireless communication device 101 (e.g. UE, eMTC device, NB-IoT device) receives a TAC during the downlink repetition period that ends in subframe n. Depending on whether the number of subframes m between the downlink repetition period and the first uplink repetition period is less than or at least equal to q, where q is 6 in legacy LTE, the wireless communication device 101 either postpones the application of the TAC to the onset (for example first subframe) of the second repetition period (UL repetition period 2) or applies it at the onset (for example first subframe k) of the first repetition period (UL repetition period 1).

It is assumed in this example that $m+r+\Delta \geq q$, where r is the number of repetitions in uplink repetition period 1, and $\Delta$ is the number of subframes between end of uplink repetition period 1 and onset of uplink repetition period 2, e.g. downlink repetition period in between, or some scheduling-related gap in the transmission. Had $m+r+\Delta$ not fulfilled being equal to or larger than q, the application of TAC would have been further postponed, until the onset of an uplink repetition period starting in a subframe s for which $s \geq n+q$.

Figure 7:
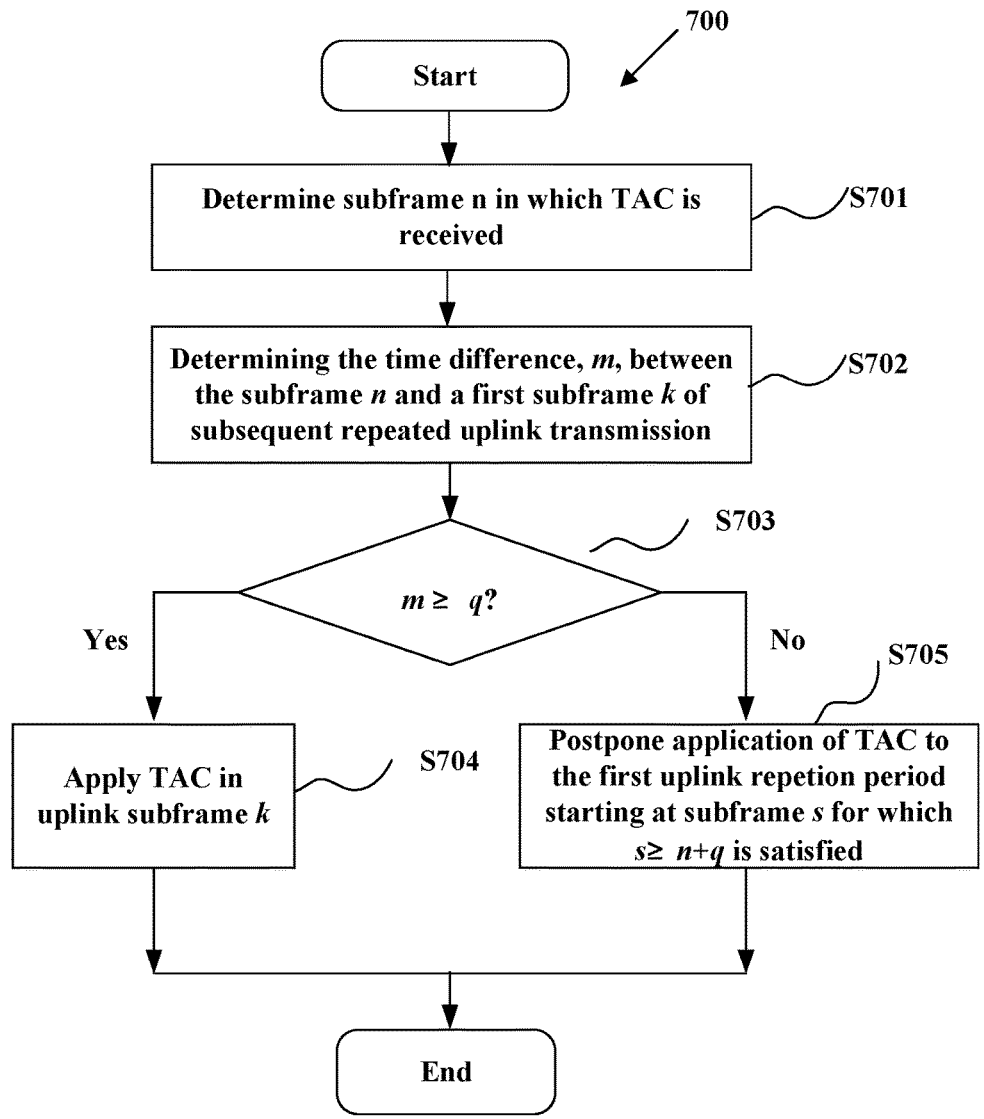
FIG. 7 is a flow chart showing one embodiment of a method in the wireless communication device.

FIG. 7 is a flow chart showing one example of a method 700 in the wireless communication device 101, which describes a flow chart for the method described in FIG. 6. In some embodiments, the flow chart in FIG. 7 can be implemented as the step S402 shown in FIG. 4 by the adapting unit 202 of the wireless communication device 101 shown in FIG. 2.

After receiving a TAC from the network node 102, in step S701, the wireless communication device 101 determines the time at which the TAC is received. For example, the determining unit 203 of the wireless communication device 101 may determine that the TAC is received in subframe n, where n is defined as the last subframe in a repetition period.

In step S702, the wireless communication device 101 determines a time difference, in the form of the number of subframes m, between the subframe n and a first subframe k of a first repeated uplink transmission T0. For example, the determining unit 203 of the wireless communication device 101 may determine the number of subframes m that will pass from the receiving of TAC till onset (first frame) of uplink repetition period 1 shown in FIG. 6.

In step S703, the wireless communication device 101 may decide whether application of the TAC in subframe n+q would occur after the first subframe till the end of the uplink repetition period 1, wherein q stands for the specified time depending on the type of the used Radio Access Technology RAT, in the form of the number of subframes. For example, the deciding unit 204 in the wireless communication device 101 may perform this deciding step by comparing m and q, for example q=6 in legacy LTE.

If this number m is greater than or equal to the number q, (S703: Yes), in step S704, the wireless communication device 101 will apply the TAC in the first uplink transmission period. For example, the applying unit 205 of the wireless communication device 101 may apply the TAC at the first subframe k of the first repeated uplink transmission shown as uplink repetition period 1.

If on the other hand m is less than q (S703: No), in step S705, the wireless communication device 101 may postpone the application of the TAC until the next uplink repetition period whose onset (first frame s) satisfies $s \geq n+q$. For example, the applying unit 205 of the wireless communication device 101 may apply the TAC at the first subframe s of the second repeated uplink transmission shown as uplink repetition period 2 or any other repetition period whose first frame s satisfies $s n+q$.

Although FIGS. 6 and 7 are described by the example in which the wireless communication device 101 is configured to transmit only one uplink repeated signal, the same method is suitable for the example in which the wireless communication device 101 is configured to transmit at least two uplink signals not overlapping with each other in time.

As described in the above embodiments, in the proposed TAC applying method herein, the TAC shall be applied not earlier than a specified delay from the reception of TAC and shall not be applying during an ongoing repetition period. That is, a time difference between the time at which the TAC is applied and a time at which the TAC is received shall be greater than or equal to a specified time depending on the type of the used Radio Access Technology, and application of the TAC shall not occur during a period after a first subframe of a repeated uplink transmission till the end of said repeated uplink transmission. For example, the application of the TAC shall not occur during a period after a first subframe of uplink repetition period 1 until the end of uplink repetition period 1, and the application of the TAC shall not occur during a period after a first subframe of uplink repetition period 2 till the end of uplink repetition period 2, and so on.

The new rule proposed herein is applicable to the case when the wireless communication device is configured to transmit at least two uplink signals whose repetition periods partly overlap with each other in time. In one embodiment, the method in wireless communication device of adapting application of TAC when configured to transmit at least two repeated uplink signals during overlapping repetition periods is proposed herein.

In this case the disclosed rule requires the wireless communication device to apply the received TAC at the start of the repetition period of any of the uplink signals that does not overlap in time with the repetition period of any of the other uplink signals.

As described in FIGS. 6 and 7, the TAC also in this case should be applied not earlier than in n+q time resource e.g. q=6 subframes for LTE. This technique is further elaborated with an example comprising 2 uplink signals configured with repetitions over overlapping repetition periods. However, the technique is applicable to any number of uplink signals configured to transmit with certain repetitions over at least partly overlapping time.

Assume that the wireless communication device 101 is configured with one first signal with a certain repetition over a first repetition period (T1) and at least a second signal with a certain repetition over a second repetition period (T2). It is further assumed that T1 and T2 at least partly overlap in time. For example, the wireless communication device 101 can be configured to transmit the first signal such as PUSCH with 32 repetitions over T1. The wireless communication device 101 may also be configured to transmit the second signal such as random access with certain number of repetitions during T2. In yet another embodiment it is assumed that the UE performs RA during T0 with one transmission attempt, i.e., an original transmission only, without repetitions.

The wireless communication device 101 may initiate RA transmission autonomously or in response to a request received from the network node 102. The UE may perform RA transmission for one or more of the following reasons e.g., for performing or enabling eNB to perform positioning measurement such as TA, UE Rx-Tx time difference, eNB Rx-Tx time difference, etc.

According to some embodiments of the disclosed method the wireless communication device 101 behavior is as follows; the wireless communication device 101:
- is not allowed to apply any of the received TACs to adjust uplink transmit timing during ongoing uplink repetition periods of any of the uplink signals but is allowed to autonomously adjust its uplink transmit timing when no repetition period is ongoing, such as:
- in a time resource occurring not earlier than n+X time resource (for example n+q in subframe) and in a time resource occurring at the start of the repetition period of a signal with the earliest starting time compared to the starting times of repetition periods of other signals overlapping in time or
- in a time resource occurring not earlier than n+X time resource (for example n+q in subframe) and in a time resource occurring after the end of the repetition period of a signal with the latest terminating time compared to the terminating times of repetition periods of other signals overlapping in time.

In some embodiments, the relative alignment between the repetition periods (Ta, Tb) (and possibly when to perform the establishment of the relations between the repetition periods) should be affected by the delay n+X. However, in other embodiments, the relative alignment between the repetition periods (Ta, Tb) (and possibly when to perform the establishment of the relations between the repetition periods) should not be affected by the delay n+X.

The above UE behavior is elaborated with an example where the first and second signal transmission have at least partly overlapping repetition periods of T1 and T2 respectively. Assume that T1 starts before T2 and T1 ends before T2, i.e., T2 terminates after T1. In this example, the UE is not allowed to apply any TAC command to adjust its uplink timing from the start of T1 and until the end of T2. However, the UE is allowed to apply the received TAC command to adjust or change its uplink transmit timing in a time resource occurring just before T1 or just after T2 provided that time resource occurs not earlier than n+X (for example n+q in subframe, q=6 subframes for LTE) time resource.

Figure 8:
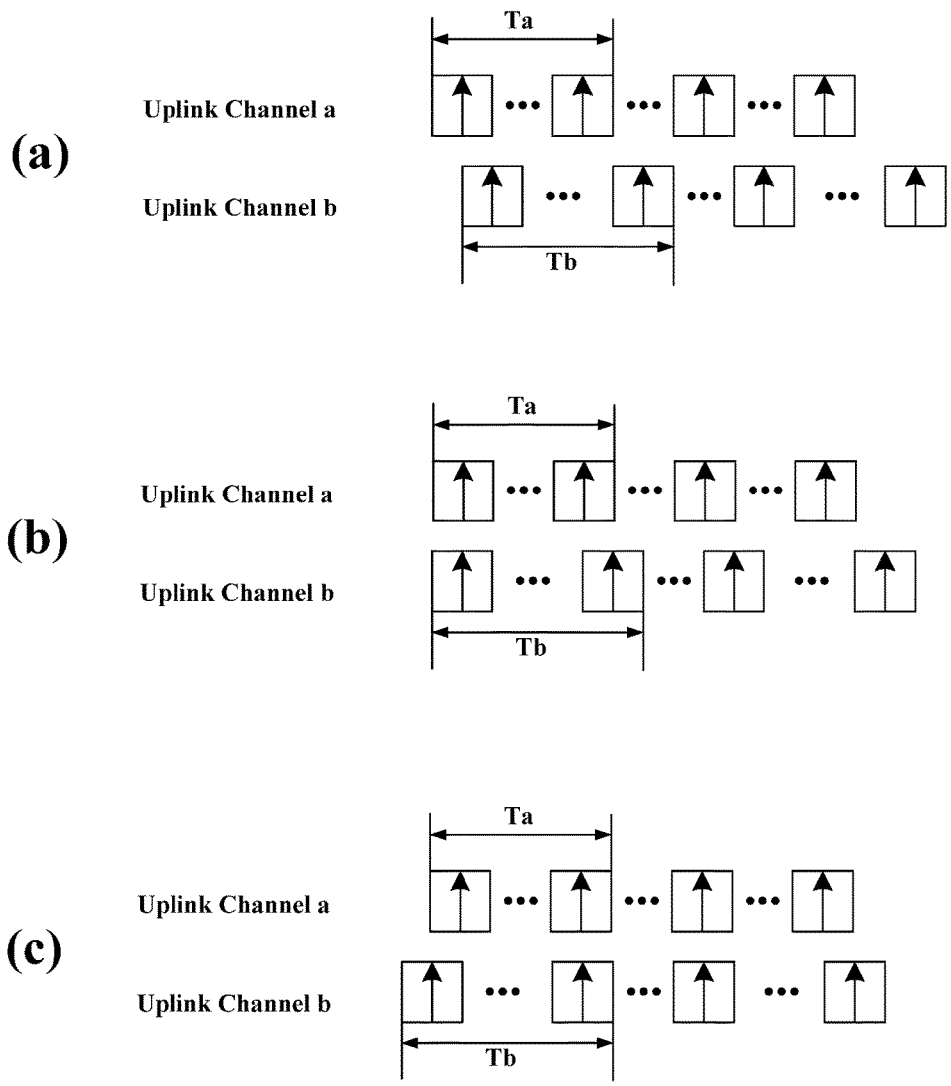
FIG. 8 is a schematic diagram showing one embodiment of aligning operations in the wireless communication device; wherein (a) shows at least two uplink signals whose repetition periods partly overlap with each other in time; (b) and (c) show the aligned signals.

FIG. 8 is a schematic diagram showing an example of aligning operations in the wireless communication device 101. The aligning operations may be performed by the aligning unit 207 of the wireless communication device 101. In some embodiments, the wireless communication device 101 further includes a transmitting unit 206. As shown in FIG. 8(a), the transmitting unit 206 may be configured to transmit at least two uplink signals whose repetition periods partly overlap with each other in time. For example, the two uplink signals with different repetition periods Ta, Tb can be transmitting in uplink channel a and uplink channel b respectively.

The aim of this approach is to allow alignment between the repetition periods of multiple uplink signals as much as possible. This alignment enables the wireless communication device 101 to apply the received TAC command to adjust its uplink transmit timing immediately or with a shorter delay after the end of the repetition period of each uplink signal and as soon as the after the occurrence of the time resource n+X. In other words, the overlapping time of the repetition periods (Ta, Tb) is maximized or single transmission of uplink signals is minimized. Examples are shown below.

In some embodiments, the wireless communication device 101 may adjust at least two uplink signals with certain number of repetitions by ensuring that their repetition periods are related by one or more of the following relations:
- Their repetition periods start at the same time e.g. in the same time resource such as in the same subframe, as shown in FIG. 8(b);
- Their repetition periods end at the same time e.g. in the same time resource such as in the same subframe, as shown in FIG. 8(c);
- Their repetition periods start within a certain time duration (Δ1) e.g. within a number X of time resources such as 5 subframes;
- Their repetition periods end within a certain time duration (Δ2) e.g. within a number Y of time resources such as 10 subframes.

Furthermore, although this approach is described as taking place in the wireless communication device 101, a similar method can be implemented in a node, which can be a network node 102 in communication with the wireless communication device 101, which can also be a user equipment (UE). In other embodiments, a method in a node of configuring uplink signals with repetitions to enhance UE uplink TAC application procedure is described herein.

In this method, for example shown in S502 of FIG. 5, a network node 102 may configure the wireless communication device 101 with at least two uplink signals with certain number of repetitions by ensuring that their repetition periods are related by one or more of the following relations:
- Their repetition periods start at the same time e.g. in the same time resource such as in the same subframe;
- Their repetition periods end at the same time e.g. in the same time resource such as in the same subframe;
- Their repetition periods start within a certain time duration ($\Delta 1$) e.g. within a number X of time resources such as 5 subframes;
- Their repetition periods end within a certain time duration ($\Delta 2$) e.g. within a number Y of time resources such as 10 subframes.

The above relations between the repetition periods are established or ensured by the node if it is a UE when it is determined by the UE that the TAC has to be applied by the UE, e.g. when the UE has received or expected to receive at least one TAC from the network node. The above relations between the repetition periods are established or ensured by the node if the node is a network node when it is determined by the NW node that the UE is expected to be configured or is configured with at least one TAC for adjusting the uplink timing of the UE. This can be determined for example when the NW node has identified that the propagation delay between the UE and the NW node is larger than a certain threshold, e.g., 3 µs. The above relations between the repetition periods can be implementation specific, pre-defined or configured at the UE by the network node.

For example, assume that the UE is configured by the network node to transmit the first signal, PUSCH, with a certain repetition over the repetition period of T1. During T1 the network node may further request the UE to transmit second signal, random access, with a certain repetition over the repetition period of T2. As a special case, the repetition for the second signal may be 1, i.e., R=1. In one exemplary implementation, the UE may be configured to transmit RA with all repetitions by the end of T1, i.e., T2 ends in the single and last time resource just before or after the T1. By scheduling T2 at the end of T1, the UE is allowed to adjust its uplink transmit timing immediately after T1, or one time resource after T1. In other words, the UE transmit timing adjustment is not delayed or the adjustment is applied with minimal delay when there are two or more signals configured for uplink transmissions with overlapping repetition periods. In another example, the transmission during T1 has precedence over the transmission in T2, and since T2 extends over the remaining time of T1, the UE can correct the timing at the start of T1. But the UE would not be allowed to correct the timing at the onset of T2, since there would be a part of T1 left after T2 had been completed.

Although not shown in the drawings, the proposed embodiments herein can also include further embodiments. Further embodiments may be suitable in the following situation. A wireless communication device 101 is receiving a plurality of TACs from a network node (for example eNodeB) but does not take them into account immediately because of the considerations about the delay discussed above. Instead, the UE rather remembers the TACs till a later point in time which is more suitable for uplink timing adjustment. There are at least the following possibilities:
1. Only the last received TA command is taken into account. The earlier received TA commands are discarded. Thus, to the network node (eNB) it is as though the earlier TA commands are lost. With this approach, eNB does not really need to be aware that the UE is discarding the earlier TA commands. In this embodiment, the applying unit 205 is configured to only apply the last received TAC, for example.
2. All TA commands (accumulated) take effect at the same time. Here the UE sums all TA commands to be applied in one step. This approach allows eNB to send several TA commands corresponding to small timing adjustments over a period of time which then can take effect at the appropriate time. This assumes that eNB is aware that the UE is buffering the TA commands. In this embodiment, the wireless communication device 101 further includes summing unit 208 configured to sum the plurality of TACs; and the applying unit 205 is configured to apply the summed plurality of TACs, for example.
3. TA commands are accumulated to take effect stepwise at appropriate different times. Here the TA adjustment is too large to be applied in one step, so the UE sums all TA commands and divides them into separate increments to be applied in several steps, each increments being not greater than the maximum TA adjustment possible/allowed. Here, too, the NW node needs to be aware that the UE is buffering the TA commands. In this embodiment, the wireless communication device 101 further includes: a summing unit 208 configured to sum the plurality of TACs; and a dividing unit 209 configured to divide the plurality of TACs into a plurality of separate increments, each increment being not greater than the maximum timing advance adjustment allowed. The applying unit 205 is configured to apply the plurality of increments as TAC in a plurality of processes (steps), respectively.

Figure 9:
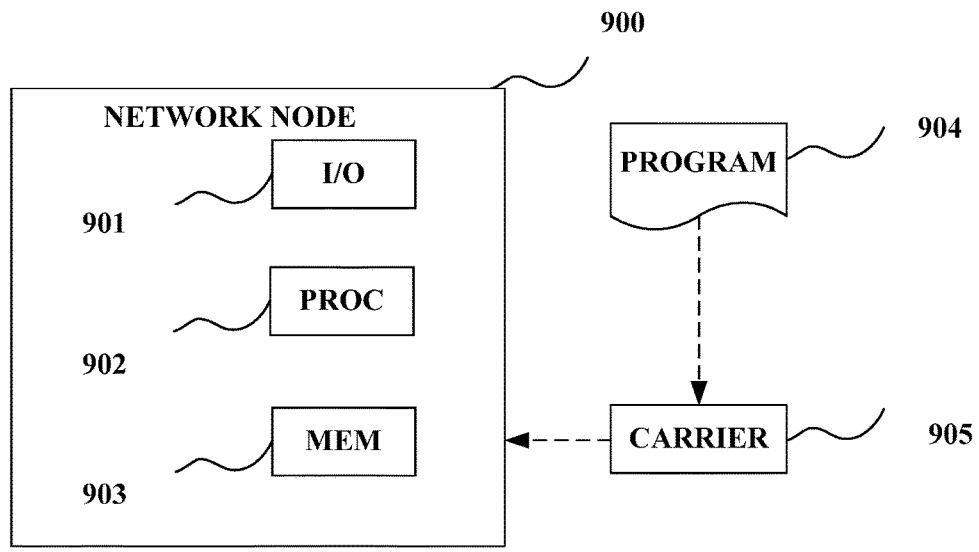
FIG. 9 is a schematic block diagram showing one embodiment of a network node.
Figure 10:
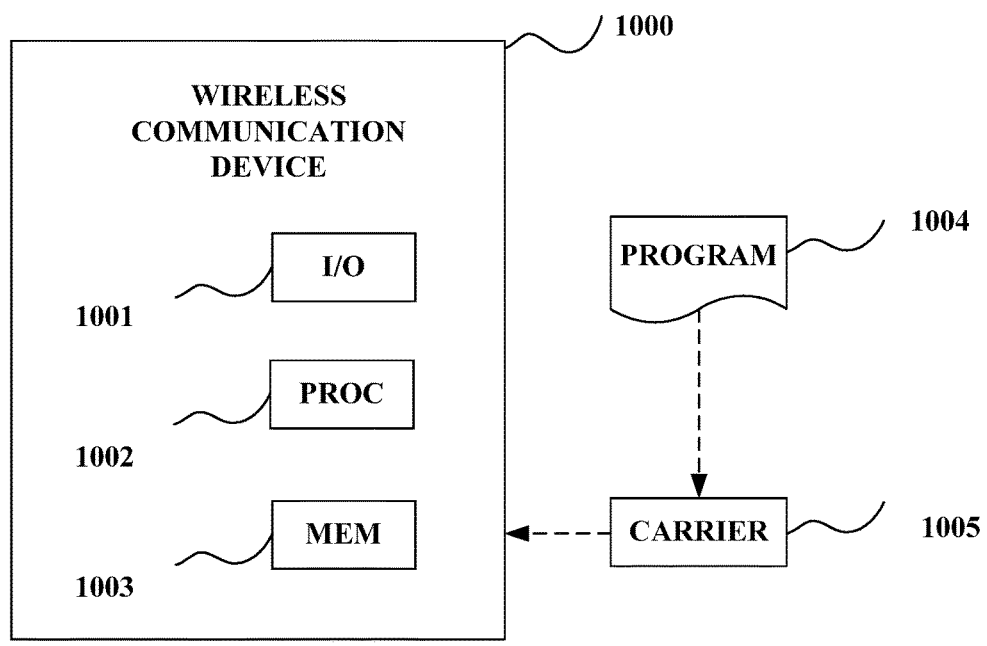
FIG. 10 is a schematic block diagram showing one embodiment of a wireless communication device.

FIG. 9 is a schematic block diagram showing an example of a network node 900. FIG. 10 is a schematic block diagram showing one embodiment of a wireless communication device 1000.

In some embodiments, the network node 900 may include but is not limited to an Input/Output Interface (shown as I/O) 901, a processor (shown as PROC) 902, and a memory (shown as MEM) 903. In some embodiments, the wireless communication device 1000 may include but is not limited to an Input/Output Interface (shown as I/O) 1001, a processor (shown as PROC) 1002, and a memory (shown as MEM) 1003.

The memory 903 and the memory 1003 may comprise a volatile (e.g. RAM) and/or non-volatile memory (e.g. a hard disk or flash memory). In some embodiments, the memory 903 and the memory 1003 may be configured to store a computer program, which, when executed by the processor 902 and processor 1002, causes the processor to carry out any of the above mentioned methods. The combination of processor 902 or 1002 with such a memory 903 or 1003 may be referred to as a processing circuit; it will be appreciated that when the memory 903 or 1003 stores a computer program for carrying out one or more of the techniques described herein, the processing circuit is thereby configured to carry out those one or more techniques. In another embodiment, the computer program can be stored in a remote location for example computer program product (shown as PROGRAM) 904 and 1004, and accessible by the processor 902 and 1002 via for example carrier 905 and 1005.

The computer program product can be distributed and/or stored on a removable computer readable media, e.g. diskette, CD (Compact Disk), DVD (Digital Video Disk), flash or similar removable memory media (e.g. compact flash, SD secure digital, memorystick, miniSD, MMC multimedia card, smart media), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

The several embodiments discussed in detail above are described for LTE. However, the embodiments are applicable to any RAT or multi-RAT systems, where the UE receives and/or transmits signals (e.g. data) e.g. LTE FDD/TDD, WCDMA/HSPA, GSM/GERAN, Wi Fi, WLAN, CDMA2000, NR, etc. The network node could be configured for operation using more than one cell, e.g. using PCell, SCell, PSCell.

Although the method disclosed in this specification is exemplified for the case when the communication takes place between a network node and a UE, the same method could also be applied when the communication occurs between at least two nodes; node 1 and node 2.

Examples of a first node include NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT, etc.

Examples of a second node include target device, device to device (D2D) UE, proximity capable UE (i.e., ProSe UE), machine type UE or UE capable of machine to machine (M2M) communication, PDA, PAD, Tablet, mobile terminals, smart phone, laptop embedded equipped (LEE), laptop mounted equipment (LME), USB dongles, etc.

In case of ProSe (also known as D2D, sidelink) operation, the communication takes place between two ProSe capable UEs. The ProSe operation by a UE is in a half-duplex mode, i.e. the UE can either transmit ProSe signals/channels or receive ProSe signals/channels. The ProSe UEs can also act as ProSe relay UEs whose tasks are to relay some signals between ProSe UEs, but also to other nodes (e.g. network node). There is also associated control information for ProSe, some of which is transmitted by ProSe UEs and the other is transmitted by eNBs (e.g., ProSe resource grants for ProSe communication transmitted via cellular downlink control channels). The ProSe transmissions may occur on resources which are configured by the network or selected autonomously by the ProSe UE. The ProSe transmissions (e.g. PSDCH) include several (e.g. 3) retransmissions that are transmitted on consecutive subframes. The retransmissions or repetitions are needed to achieve good SD-RSRP measurement performance. The SD-RSRP measurement is used to perform ProSe relay selection by ProSe UEs.

A ProSe UE that operates under the network coverage may follow the timing of the network node while it employs retransmissions/repetitions. According to the current specification, the ProSe UE follows the Timing Advance Command (TAC) if it is available. Absent the rule proposed herein on when to apply the received TAC, this may cause problems for the receiving node, e.g. those UEs that perform measurement on these transmitted signals. In this case, the ProSe determines the number of subframes m that needs to pass until onset of a ProSe (sidelink) transmission period. If this number m exceeds or equals a number q, e.g. q=6 as in legacy LTE where the received TAC is applied, then the ProSe UE may apply the TAC in the first sidelink transmission period. If on the other hand m is less than q, then the ProSe UE postpones the application of the TAC until the next sidelink transmissions period (i.e. that includes all retransmission on consecutive subframes) whose onset is after subframe n+q.

It should be noted that the word "comprising" or "including" does not exclude the presence of other elements or steps than those listed and the words "a" or "an" preceding an element do not exclude the presence of a plurality of such elements. The invention can at least in part be implemented in hardware, firmware or software. It should further be noted that any reference signs do not limit the scope of the claims, and that several "means", "devices", and "units" may be represented by the same item of hardware.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore, it is intended that the present embodiments not be limited to the particular embodiment disclosed as the best mode contemplated for carrying out the present technology, but that the present embodiments include all embodiments falling within the scope of the appended claims.

ABBREVIATION EXPLANATION

BW Bandwidth
CE Coverage enhancement
CP Cyclic prefix
DCI Downlink control information
DFT Discrete Fourier transform
DMRS Demodulation reference signal
DRX Discontinuous reception
eMTC Evolved MTC
EUTRA(N) Evolved universal terrestrial radio access (network)
FDD Frequency division duplex
GERAN GSM EDGE radio access network
GSM Global system for mobile communication
HARQ Hybrid automatic repeat request
HD-FDD Half-duplex FDD
IoT Internet of things
LTE Long term evolution of UMTS
MAC Media access control
MIB Master information block
M-PDCCH Machine type PDCCH
MTC Machine type communication
NB-IoT Narrowband IoT
NB-MIB Narrowband MIB
NB-M-PDCCH Narrowband M-PDCCH
NB-PBCH Narrowband PBCH
NB-PDCCH Narrowband PDCCH
NB-PDSCH Narrowband PDSCH
NB-PSS Narrowband PSS
NB-SSS Narrowband SSS
NB-PUCCH Narrowband PUCCH
NB-PUSCH Narrowband PUSCH
NTA Non-time alignment
OFDM Orthogonal frequency division multiplexing
PA Power amplifier
PBCH Physical broadcast channel
PDCCH Physical downlink control channel
PDSCH Physical downlink shared channel
PRACH Physical random access channel PRB Physical resource block
PSS Primary synchronization signal
PUCCH Physical uplink control channel
PUSCH Physical uplink shared channel
RA Random access
RAT Radio Access Technology
RRC Radio resource control
Rx Receive(r)
SRS Sounding reference signal
SSS Secondary synchronization signal
TA Timing advance
TAC Timing advance command
TAG Timing advance group
TDD Time division duplex
Tx Transmit(ter)
TTI Transmission time interval
UE User equipment
UL Uplink

What is claimed is:

1. A wireless communication system comprising a wireless communication device and a network node, the wireless communication device operating in an enhanced coverage mode, the enhanced coverage mode comprising sequential repetition of messages sent from the wireless communication device to the network node,
wherein the network node includes a transmitter configured to send a Timing Advance Command (TAC) to the wireless communication device; and
wherein the wireless communication device includes:
a receiver configured to receive the TAC from the network node; and
a processing circuit configured to adapt a time at which the TAC is applied, such that a time difference between the time at which the TAC is applied and a time at which the TAC is received shall be greater than or equal to a specified time that depends on a type of Radio Access Technology (RAT) that is in use, and such that application of the TAC shall not occur during a period after a first subframe of a repeated uplink transmission till the end of said repeated uplink transmission.

2. The wireless communication system of claim 1, wherein the processing circuit is further configured to:
determine a subframe n at which the TAC is received, and determine a time difference, in the form of the number of subframes m, between the subframe n and a first subframe k of a first repeated uplink transmission;
decide whether application of the TAC in subframe n+q would occur after the first subframe till the end of the first repeated uplink transmission and output a respective decision, wherein q stands for the specified time in the form of the number of subframes; and
apply the TAC according to the decision.

3. The wireless communication system of claim 2, wherein if m is greater than or equal to q, the TAC is applied in the first subframe k.

4. The wireless communication system of claim 2, wherein the wireless communication device further includes a transmitter configured to transmit only one uplink signal or at least two uplink signals whose repetition periods do not overlap with each other in time, and wherein the processing circuit is configured to adapt the time at which the TAC is applied such that if m is less than q, the TAC is applied in a subframe s representing a first subframe of a first repeated uplink transmission period for which s satisfies s≥n+q.

5. The wireless communication system of claim 2, wherein the wireless communication device further includes a transmitter configured to transmit at least two uplink signals whose repetition periods partly overlap with each other in time, and wherein the processing circuit is configured to adapt the time at which the TAC is applied such that the TAC is applied at a first subframe of a first repetition period of any one of the at least two uplink signals that does not overlap in time with a repetition period of the others of the at least two uplink signals, said first repetition period fulfilling a criterion that a time difference between reception of the TAC and start of the first repetition period is greater than q.

6. The wireless communication system of claim 5, wherein the transmitter is configured to transmit multiple uplink signals with different repetition periods (Ta, Tb), and wherein the processing circuit is configured to align the repetition periods by shifting in time at least one of start or end points of the repetition periods (Ta, Tb), such that an overlapping time of the repetition periods (Ta, Tb) is maximized or single transmission of the multiple uplink signals is minimized.

7. The wireless communication system of claim 6, wherein the repetition periods (Ta, Tb) are aligned of any one of the followings rules:
aligning the repetition periods to start at the same time;
aligning the repetition periods to end at the same time;
aligning the repetition periods to start within a certain time duration $\Delta 1$; and
aligning the repetition periods to end within a certain time duration $\Delta 2$.

8. The wireless communication system of claim 2, wherein q=6.

9. The wireless communication system of claim 1, wherein the wireless communication device receives a plurality of TACs while unable or prohibited to take them into account immediately, and wherein the processing circuit is configured to only apply the last received TAC.

10. The wireless communication system of claim 1, wherein the wireless communication device receives a plurality of TACs while unable or prohibited to take them into account immediately, wherein the processing circuit is further configured to sum the plurality of TACs and
to apply the summed plurality of TACs.

11. The wireless communication system of claim 1, wherein the wireless communication device receives a plurality of TACs while unable or prohibited to take them into account immediately, and wherein the processing circuit is further configured to:
sum the plurality of TACs; and
divide the plurality of TACs into a plurality of separate increments, each increment being not greater than a maximum timing advance adjustment allowed; and
apply the plurality of increments as TAC in a plurality of processes, respectively.

12. The wireless communication system of claim 1, wherein the network node further includes a configuring unit configured to:
configure the wireless communication device to transmit multiple uplink signals with different repetition periods (Ta, Tb); and
configure the wireless communication device to align the repetition periods by shifting in time at least one of the start or end points of the repetition periods (Ta, Tb), such that the overlapping time of the repetition periods (Ta, Tb) is maximized or single transmission of the multiple uplink signals is minimized.

13. The wireless communication system of claim 12, wherein the repetition periods (Ta, Tb) are aligned of any one of the followings rules:
- aligning the repetition periods to start at the same time;
- aligning the repetition periods to end at the same time;
- aligning the repetition periods to start within a certain time duration; and
- aligning the repetition periods to end within a certain time duration.

14. The wireless communication system of claim 1, wherein the network node further includes a processing circuit configured to generate a TAC to be used by the wireless communication device, and wherein the transmitter of the network node is configured to send the generated TAC to the wireless communication device.

15. A method in a wireless communication device that operates in an enhanced coverage mode, the enhanced coverage mode comprising sequential repetition of messages sent from the wireless communication device to a network node, the method comprising:
- receiving a Timing Advance Command TAC from the network node; and
- adapting a time at which the TAC is applied, such that a time difference between the time at which the TAC is applied and a time at which the TAC is received shall be greater than or equal to a specified time that depends on a type of Radio Access Technology (RAT) that is in use, and such that application of the TAC shall not occur during a period after a first subframe of a repeated uplink transmission till the end of said repeated uplink transmission.

16. The method of claim 15, wherein the adapting further includes:
- determining a subframe n at which the TAC is received;
- determining a time difference, in the form of the number of subframes m, between the subframe n and a first subframe k of a first repeated uplink transmission;
- deciding whether application of the TAC in subframe n+q would occur after the first subframe till the end of the first repeated uplink transmission, wherein q stands for the specified time in the form of the number of subframes; and
- applying the TAC according to the deciding.

17. The method of claim 16, wherein if m is greater than or equal to q, the TAC shall be applied in the first subframe k.

18. The method of claim 16, wherein the wireless communication device is configured to transmit only one uplink signal or at least two uplink signals whose repetition periods do not overlap with each other in time, and wherein if m is less than q, the TAC shall be applied in a subframe s representing a first subframe of a first repeated uplink transmission period for which s satisfies s≥n+q.

19. The method of claim 16, wherein the method comprises transmitting at least two uplink signals whose repetition periods partly overlap with each other in time, and wherein the method comprises applying the TAC at a first subframe of a first repetition period of any one of the at least two uplink signals that does not overlap in time with a repetition period of the others of the at least two uplink signals, said first repetition period fulfilling a criterion that a time difference between reception of the TAC and start of the first repetition period is greater than q.

20. The method of claim 19, wherein the method further comprises transmitting multiple uplink signals with different repetition periods (Ta, Tb), and aligning the repetition periods by shifting in time at least one of start or end points of the repetition periods (Ta, Tb), such that overlapping time of the repetition periods (Ta, Tb) is maximized or single transmission of the multiple uplink signals is minimized.

21. The method of claim 20, wherein the repetition periods (Ta, Tb) are aligned of any one of the followings rules:
- aligning the repetition periods to start at the same time;
- aligning the repetition periods to end at the same time;
- aligning the repetition periods to start within a certain time duration Δ1; and
- aligning the repetition periods to end within a certain time duration Δ2.

22. The method of claim 16, wherein q=6.

23. The method of claim 15, wherein the method comprises receiving a plurality of TACs while unable or prohibited to take them into account immediately, and wherein the method further includes only applying the last received TAC.

24. The method of claim 15, wherein the method comprises receiving a plurality of TACs while unable or prohibited to take them into account immediately, and wherein the method further includes summing the plurality of TACs and applying the summed plurality of TACs.

25. The method of claim 15, wherein the method comprises receiving a plurality of TACs while unable or prohibited to take them into account immediately; and wherein the method further includes:
- summing the plurality of TACs;
- dividing the plurality of TACs into a plurality of separate increments, each increment being not greater than a maximum timing advance adjustment allowed; and
- applying the plurality of increments as TAC in a plurality of steps.

26. The method of claim 15, wherein the wireless communication device is an evolved Machine Type Communication (eMTC) device or Narrow Band Internet of Things (NB-IoT) device.

27. The method of claim 15, wherein the wireless communication device and the network node operate in a Half Duplex Frequency Division Duplex (HD-FDD) mode.

28. The method of claim 15, wherein the wireless communication device and the network node operate in Coverage Enhancement mode A or B, wherein in Coverage Enhancement mode A, one signal is repeated up to 32 times during a repetition period, and wherein in Coverage Enhancement mode B, one signal is repeated up to 2048 times during a repetition period.

29. A method in a network node in communication with a wireless communication device that operates in an enhanced coverage mode, the enhanced coverage mode comprising sequential repetition of messages sent from the wireless communication device to the network node, the method comprising:
- configuring the wireless communication device to transmit multiple uplink signals with different repetition periods (Ta, Tb); and
- configuring the wireless communication device to align the repetition periods by shifting in time at least one of start or end points of the repetition periods (Ta, Tb), such that an overlapping time of the repetition periods (Ta, Tb) is maximized or single transmission of the multiple uplink signals is minimized.

30. The method of claim 29, wherein the repetition periods (Ta, Tb) are aligned of any one of the followings rules:
- aligning the repetition periods to start at the same time;
- aligning the repetition periods to end at the same time;

aligning the repetition periods to start within a certain time duration; and aligning the repetition periods to end within a certain time duration.

31. The method of claim 29, wherein the method further includes:
generating a Timing Advance Command TAC to be used by the wireless communication device; and
sending the TAC to the wireless communication device.

32. A wireless communication device that operates in an enhanced coverage mode, the enhanced coverage mode comprising sequential repetition of messages sent from the wireless communication device to a network node, wherein the wireless communication device includes:
a receiver configured to receive a Timing Advance Command TAC from the network node; and
a processing circuit configured to adapt a time at which the TAC is applied, wherein a time difference between the time at which the TAC is applied and a time at which the TAC is received shall be greater than or equal to a specified time that depends on a type of Radio Access Technology (RAT) that is in use, and application of the TAC shall not occur during a period after a first subframe of a repeated uplink transmission till the end of said repeated uplink transmission.

33. The wireless communication device of claim 32, wherein the processing circuit is configured to:
determine a subframe n at which the TAC is received, and determine a time difference, in the form of the number of subframes m, between the subframe n and a first subframe k of a first repeated uplink transmission;
decide whether application of the TAC in subframe n+q would occur after the first subframe till the end of the first repeated uplink transmission and output a respective decision, wherein q stands for the specified time in the form of the number of subframes; and
apply the TAC according to the decision.

34. The wireless communication device of claim 33, wherein the processing circuit is configured to apply the TAC in the first subframe k, if m is greater than or equal to q.

35. The wireless communication device of claim 33, wherein the wireless communication device further includes a transmitter configured to transmit only one uplink signal or at least two uplink signals whose repetition periods do not overlap with each other in time, and wherein the processing circuit is configured to apply the TAC in a subframe s representing a first subframe of a first repeated uplink transmission period for which s satisfies s≥n+q, if m is less than q.

36. The wireless communication device of claim 33, wherein the wireless communication device further includes a transmitter configured to transmit at least two uplink signals whose repetition periods partly overlap with each other in time, the processing circuit is configured to apply the TAC at a first subframe of a first repetition period of any one of the at least two uplink signals that does not overlap in time with a repetition period of the others of the at least two uplink signals, said first repetition period fulfilling a criterion that a time difference between reception of the TAC and start of the first repetition period is greater than q.

37. The wireless communication device of claim 36, wherein the transmitter is configured to transmit multiple uplink signals with different repetition periods (Ta, Tb), and the processing circuit is further configured to align the repetition periods by shifting in time at least one of start or end points of the repetition periods (Ta, Tb), such that an overlapping time of the repetition periods (Ta, Tb) is maximized or single transmission of the multiple uplink signals is minimized.

38. The wireless communication device of claim 37, wherein the processing circuit is configured to align the repetition periods (Ta, Tb) according to any one of the following rules:
aligning the repetition periods to start at the same time;
aligning the repetition periods to end at the same time;
aligning the repetition periods to start within a certain time duration Δ1; and
aligning the repetition periods to end within a certain time duration Δ2.

39. The wireless communication device of claim 33, wherein q=6.

40. The wireless communication device of claim 32, wherein the processing circuit is configured to only apply the last received TAC in the event that the wireless communication device receives a plurality of TACs while unable or prohibited to take them into account immediately.

41. The wireless communication device of claim 32, wherein the processing circuit is configured to, in the event that the wireless communication device receives a plurality of TACs while unable or prohibited to take them into account immediately, sum the plurality of TACs and apply the summed plurality of TACs.

42. The wireless communication device of claim 32, wherein the processing circuit is configured to, in the event that the wireless communication device receives a plurality of TACs while unable or prohibited to take them into account immediately: sum the plurality of TACs; divide the plurality of TACs into a plurality of separate increments, each increment being not greater than a maximum timing advance adjustment allowed; and apply the plurality of increments as TAC in a plurality of processes, respectively.

43. The wireless communication device of claim 32, wherein the wireless communication device is an evolved Machine Type Communication (eMTC) device or Narrow Band Internet of Things (NB-IoT) device.

44. A network node for use in communication with a wireless communication device that operates in an enhanced coverage mode, the enhanced coverage mode comprising sequential repetition of messages sent from the wireless communication device to the network node, the network node comprising processing circuit configured to:
configure the wireless communication device to transmit multiple uplink signals with different repetition periods (Ta, Tb); and
configure the wireless communication device to align the repetition periods by shifting in time at least one of start or end points of the repetition periods (Ta, Tb), such that an overlapping time of the repetition periods (Ta, Tb) is maximized or single transmission of the multiple uplink signals is minimized.

45. The network node of claim 44, wherein the repetition periods (Ta, Tb) are aligned according to any one of the followings rules:
aligning the repetition periods to start at the same time;
aligning the repetition periods to end at the same time;
aligning the repetition periods to start within a certain time duration; and
aligning the repetition periods to end within a certain time duration.

46. The network node of claim 44, wherein the processing circuit is further configured to generate a Timing Advance Command TAC to be used by the wireless communication device, and wherein the network node further comprises a transmitter configured to send the generated TAC to the wireless communication device.

* * * * *

UNITED STATES PATENT AND TRADEMARK OFFICE
CERTIFICATE OF CORRECTION

PATENT NO. : 10,541,802 B2
APPLICATION NO. : 15/253404
DATED : January 21, 2020
INVENTOR(S) : Axmon et al.

It is certified that error appears in the above-identified patent and that said Letters Patent is hereby corrected as shown below:

On the Title Page

Item (57), under "ABSTRACT", in Column 2, Line 7, delete "TAC" and insert -- (TAC) --, therefor.

In the Specification

In Column 4, Line 65, delete "should noted" and insert -- should be noted --, therefor.

In Column 7, Line 33, delete "(TA)" and insert -- (TAC) --, therefor.

In Column 7, Line 40, delete "(TA)" and insert -- (TAC) --, therefor.

In Column 12, Line 44, delete "s n+q." and insert -- $s \geq n+q$. --, therefor.

In the Claims

In Column 21, Line 21, in Claim 15, delete "TAC" and insert -- (TAC) --, therefor.

In Column 23, Line 7, in Claim 31, delete "TAC" and insert -- (TAC) --, therefor.

In Column 23, Line 16, in Claim 32, delete "TAC" and insert -- (TAC) --, therefor.

In Column 24, Line 66, in Claim 46, delete "TAC" and insert -- (TAC) --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*